United States Patent [19]

Barns et al.

[11] Patent Number: 4,842,626

[45] Date of Patent: Jun. 27, 1989

[54] PROCESS FOR MAKING OPTICAL FIBERS

[75] Inventors: Robert L. Barns; Edwin A. Chandross, both of Berkeley Heights; Suzanne R. Nagel, Morristown, all of N.J.

[73] Assignee: American Telephone and Telegraph Company, AT&T Bell Laboatories, Murray Hill, N.J.

[21] Appl. No.: 57,681

[22] Filed: May 28, 1987

Related U.S. Application Data

[63] Continuation of Ser. No. 762,803, Aug. 2, 1985, abandoned, which is a continuation of Ser. No. 466,293, Feb. 14, 1983, abandoned.

[51] Int. Cl.$^4$ .................... C03B 37/014; C03B 37/025
[52] U.S. Cl. .......................................... 65/2; 65/30.1; 65/900
[58] Field of Search ................ 65/3.12, 13, 18.2, 30.1, 65/DIG. 16, 900, 2

[56] References Cited

U.S. PATENT DOCUMENTS

| | | | |
|---|---|---|---|
| 3,933,454 | 1/1976 | DeLuca | 65/18.2 X |
| 4,165,224 | 8/1979 | Irven et al. | 65/3.12 |
| 4,264,347 | 4/1981 | Shintani et al. | 65/13 X |
| 4,304,581 | 12/1981 | Saifi | 65/3.12 |

FOREIGN PATENT DOCUMENTS

| | | | |
|---|---|---|---|
| 55-3365 | 1/1980 | Japan . | |
| 144437 | 11/1980 | Japan | 65/3.12 |

OTHER PUBLICATIONS

"Low-OH-Content Optical Fibre Fabricated by Vapour-Phase Axial-Deposition Method," S. Sudo et al., *Electronics Letters,* vol. 14, No. 17, Aug. 17, 1978, pp. 534–535.

*Primary Examiner*—Kenneth M. Schor
*Attorney, Agent, or Firm*—Bruce S. Schneider

[57] ABSTRACT

The extent of loss produced in fibers due to the presence of OH infrared absorption bands is significantly reduced through the use of specific expedients during, for example, the preform collapse procedure. In particular, during this procedure a carbon tetrahalide composition is employed to essentially prevent the presence of any residual hydrogen-containing entity from influencing the quality of the preform and thus from influencing the quality of the fiber ultimately produced.

11 Claims, 1 Drawing Sheet

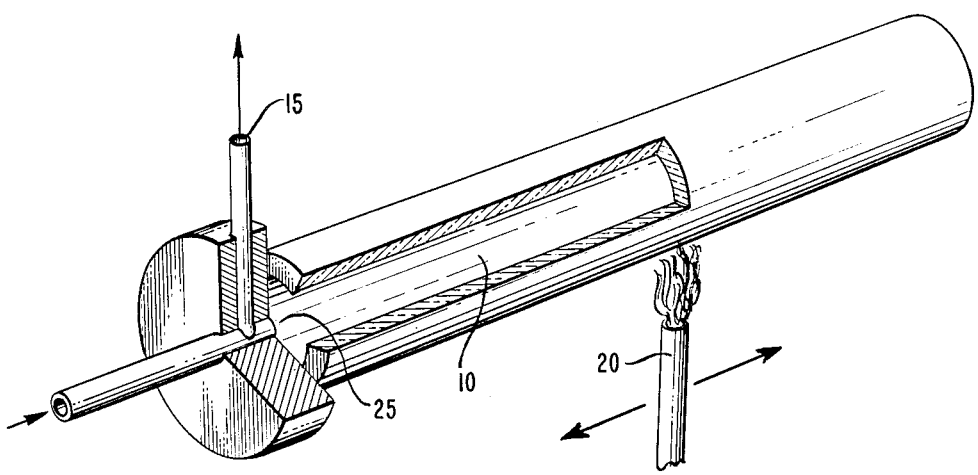

PROCESS FOR MAKING OPTICAL FIBERS

This application is a continuation of Ser. No. 762,803, filed Aug. 2, 1985, which is a continuation of application Ser. No. 466,293, filed Feb. 14, 1983, both now abandoned.

BACKGROUND OF THE INVENTION

1. Field of the Invention

This invention relates to optical communications and, in particular, to the procedures employed in the manufacture of glass optical fibers.

2. Art Background

In the manufacture of optical fibers, a glass preform, which is a selectively doped glass tube, is fabricated by a process such as MCVD (modified chemical vapor deposition), MCVD performed with a plasma, or PCVD described by D. Kuppers et al, in the *Journal of the Electrochemical Society*, 423, 1079 (1976). The preform is either constricted or sealed on one end, collapsed into a solid body, and simultaneously with the collapse or subsequently after the collapse, an optical fiber is drawn from the solid body. Bound OH moieties in the preform and in the resulting fiber absorb in the wavelength region typically employed in optical communication systems and substantially increase the signal loss in such systems. Thus, during the formation of the preform great care is taken to substantially exclude the incorporation of OH moieties, e.g., SiOH, into the preform. Generally, the predominant source of OH moieties involves hydrogen-containing entities which at the collapse temperature are typically converted to water. The water, in turn, reacts with the preform to produce bound OH moieties. Thus, to maintain the quality of the fiber ultimately produced, substantial measures are also taken during preform collapse to exclude hydrogen-containing entities.

One predominant method has been employed to prevent the incorporation of OH moieties during preform collapse. In this procedure described by K. L. Walker et al, "Reduction of Hydroxyl Contamination In Optical Fiber Preforms," *Third International Conference on Integrated Optics and Optical Fiber Communications*, San Francisco, Calif., Apr. 27–29, 1981, (New York: IEEE, 1981), WA4, 86–88 (1981), molecular chlorine is introduced during the collapse procedure. The chlorine generally reacts with water, e.g., water formed from hydrogen-containing entities, to produce hydrogen chloride through the reaction $$H_2O + Cl_2 \rightleftharpoons 2HCl + 1/2 O_2. \qquad (1)$$

The resulting HCl is not incorporated into the preform and is removed in the effluent. This molecular chlorine collapse procedure has been found to produce fibers with relatively low losses due to OH absorption—losses generally in the range 0.3 to 2 dB/km at the OH absorption peak wavelength of 1.39 $\mu$m. Nevertheless, it is certainly advantageous despite the acceptable level of loss already achieved, to substantially decrease loss to even more desirable levels.

SUMMARY OF THE INVENTION

The loss produced due to incorporation of OH moieties is substantially decreased compared to other techniques through the introduction of carbon tetrahalide compounds, such as carbon tetrachloride, into the environment of a glass body being modified for ultimate use in fabricating glass optical fibers, e.g., into the embodiment of a preform environment being collapsed. In particular, OH absorption losses as low as 0.05 dB/km at 1.39 $\mu$m have been achieved. Thus, through the use of the inventive technique, it is possible to improve significantly the quality of the fiber ultimately produced as compared to that obtainable utilizing gases such as molecular chlorine.

BRIEF DESCRIPTION OF THE DRAWING

The FIGURE is illustrative of an embodiment of the inventive technique.

DETAILED DESCRIPTION

The loss produced by OH moieties in optical fibers is significantly reduced if a carbon tetrahalide based composition, i.e., carbon tetrachloride, $CBrCl_3$, $CBr_2Cl_2$, or mixtures of these compounds, is introduced into the environment of a glass body being modified either physically or chemically. Specifically, the inventive addition of carbon tetrahalide compounds is useful for reducing OH incorporation during a variety of processes involving modification of a glass body, e.g., alteration of physical form such as during the preform collapse process and chemical modification such as during the preform fabrication process. In either case the presence of a carbon tetrahalide during modification of a glass body produces a very low level of loss in the fiber ultimately fabricated from this body. Although the inventive technique is generally applicable to procedures involving modification of glass bodies in processes leading to fiber manufacture, this disclosure employs the preform collapse procedure as a pedagogic vehicle to delineate the parameters involved in the inventive technique. Nevertheless, the same parameters are applicable to other glass body modification procedures.

The desired carbon tetrahalide composition is introduced into the the glass body environment, e.g., into the internal void, 10, of the preform tube during collapse. (The internal void is advantageously chosen since in most collapse processes the internal glass region forms the light guiding region where it is most critical to limit OH entities.) It is most desirable to use carbon tetrachloride (generally, but not necessarily, with a carrier gas) as the carbon tetrahalide based composition. The carbon tetrahalide composition is easily introduced into the environment of the preform by conventional expedients such as by passing a carrier gas through a bubbler containing the desired carbon tetrahalide composition and then flowing the carrier gas with its carbon tetrahalide composition into the preform environment. (When a combination of $CCl_4$, $CBrCl_3$ and/or $CBr_2Cl_2$ is desired, the composition is produced by combining gas flows from separate bubblers or by using a bubbler containing all of the constituents. In the former case, the mole fraction of each component introduced depends on the individual gas flow rates through each bubbler and the bubbler temperatures. In the latter case, the mole fraction of each material in the gas phase depends on, but is not equivalent to, its corresponding mole fraction in the bubbler and on the bubbler temperature. In either situation, a control sample is easily employed to determine the appropriate conditions to yield the desired ratio in the final gas flow.) Although the use of $CBrCl_3$ and $CBr_2Cl_2$ each separately or in combination is not precluded, it is more desirable to employ these carbon tetrahalides (if at all) in combination with $CCl_4$.

A contemplated explanation for this result is that HBr (the reaction product of a bromine-containing compound with water) is less stable than HCl. This relative instability of HBr necessitates the use of somewhat high concentrations of the halogen contributing species to achieve equivalent results.

The concentration of the carbon tetrahalide compound employed to scavenge hydrogen-containing entities in the preform collapse process affects other processes which are also in some situations used during the preform collapse process. For example, it is desirable at times to introduce a dopant compensator, e.g., germanium tetrachloride, together with oxygen into the preform environment during collapse. The oxygen reacts with the GeCl$_4$ to maintain the desired GeO$_2$ concentration at the inner surface of the preform. If this procedure is employed, the halogen liberated from both the germanium tetrahalide and carbon tetrahalide affects the concentration of GeO$_2$ through the chemical equilibrium of the reaction represented by the following equation:

$$GeX_4 + O_2 \rightleftharpoons GeO_2 + 2X_2 \qquad (2)$$

(X is a halogen). Therefore, if dopant compensation is to be utilized in conjunction with a carbon tetrahalide, the resulting equilibrium shift should be overcome by a corresponding increase in the amount of germanium tetrahalide composition which is employed.

Similarly, processes which produce (1) substantial halogen from a source other than a carbon tetrahalide or (2) oxygen in the preform environment, also have a potential effect on the equilibrium shown in equation (1) and thus, in turn, affect the amount of carbon tetrahalide required to remove the desired amount of water. For example, if oxygen is introduced, e.g., as a carrier gas, the equilibrium (equation (1)) is shifted toward the left side. Thus, the minimum amount of carbon tetrahalide required (for a given amount of hydrogen-containing entity) to avoid substantial OH presence in the fiber increases with the increasing presence of oxygen. (In contrast, a gas such as helium or other inert gas has little effect.) If halogen from sources other than carbon tetrahalides is also present, less carbon tetrahalide is needed. Although temperatures often affect equilibrium considerations, the temperature employed during preform collapse, e.g., 2000 to 2200 degrees C., has no substantial affect on the required level of carbon tetrahalide and, thus, on the level of OH absorption in the fiber formed from a preform produced using a carbon tetrahalide.

Generally, the inventive process is not employed as a gross removal procedure for hydrogen-containing entities. Other precautions, such as purification of reactant materials, are utilized to substantially reduce the level of the hydrogen-containing entities. For this reason, sufficient carbon tetrachloride, even in the presence of oxygen, is easly introduced to prevent the losses associated with the levels of hydrogen-containing entities present after these precautions are taken. (Generally, 1 to 10 ppm by weight of contaminating hydrogen, however bound, is present.) Nevertheless, as discussed previously, oxygen affects the minimum amount of carbon tetrachloride required for a given level of hydrogen-containing entity. Oxygen is generally present during collapse, at levels up to 0.1 atm, even if not purposely introduced. For such levels of oxygen, desirable results are obtained for typical hydrogen entity levels when a partial pressure of 0.015 atm or greater of carbon tetrachloride is introduced into the glass body environment. If oxygen is purposely introduced and thus the oxygen level is above 0.1 atm, it is typically desirable to maintain the fraction $P_{O_2}^{\frac{1}{2}}/P_{CCl_4}$ at levels below 20. ($P_{O_2}$ and $P_{CCl_4}$ are the partial pressures of $O_2$ and introduced $CCl_4$, respectively.) When lower than usual hydrogen entity levels are present (less than 1 ppm) or when less than substantially total removal is acceptable, then a correspondingly smaller amount of carbon tetrahalide or $P_{O_2}^{\frac{1}{2}}/P_{CCl_4}$ is employed. (In processes other than MCVD preform collapse, it is possible that a background of less than 0.1 atm of oxygen is present. For such cases, a correspondingly lower level of carbon tetrahalide introduction also produces desirable results.) A control sample is used to determine the precise amount of carbon tetrahalide necessary to yield the desired level of OH attenuation.

The presence of sources of oxygen and sources of halogen other than carbon tetrahalides are the primary influences introduced by processes not directly related to the inventive process. However, it is possible that other materials might be introduced for purposes outside the inventive process which might affect the reaction equilibrium between water (the composition resulting from hydrogen-containing entities) and the carbon tetrahalide composition, and thus which would require adjustment of the parameters employed in the inventive process. A control sample is easily employed to determine the corrections appropriate for each particular situation.

Irrespective of the previously discussed considerations, certain precautions should be taken. In the case of CCl$_4$ use, it is generally desirable to limit the chlorine concentration expressed as molecular chlorine in the preform environment to less than 0.3 atm. Above these levels, the high concentration of chlorine tends to form bubbles in the preform and thus produces unacceptably high losses. Additionally, oxygen in the presence of carbon tetrahalides tends to avoid carbon deposits and induces the formation of gases such as carbon dioxide, carbon monoxide, and under some conditions, phosgene. The carbon tetrahalide material should also not have an excessive hydrogen-containing entity impurity level, i.e., a level greater than 40 ppm expressed as weight fraction of H. Thus, the carbon tetrahalide composition with hydrogen levels greater than 40 ppm should preferably be purified by conventional techniques such as photochlorination and sweeping with a dry inert gas to remove HX (X=Cl or Br) and H$_2$O. Purification which produces less than 6 ppm is preferred. (Extended photochlorination of CBrCl$_3$ and CBr$_2$Cl$_2$, if necessary to obtain the desired purity level, converts some of the bound Br to Cl. However, the resulting carbon tetrahalides, as previously discussed, are quite acceptable for use in the inventive process.)

The following examples are illustrative of the subject invention.

EXAMPLE 1

Preforms produced by the MCVD process as described by S. R. Nagel et al, in *IEEE Journal of Quantum Electronics*, OE-18(4), 459–476 (1982) were employed. These preforms were first sealed at one end and then collapsed by repeated longitudinal traverses with a torch, 20, maintained at a temperature between 2000 and 2200 degrees C. Before one end of the preform was sealed, a gas flow of 330 cc per minute of oxygen was passed through a carbon tetrachloride bubbler maintained at a temperature of 40 degrees C. This CCl$_4$ containing gas flow was combined with a second 1000 cc per minute flow of oxygen. The combined gas flow was introduced at one end of the preform, 25, and was maintained for a time sufficient to purge the tube. The end of the preform opposite the point of gas introduction was then sealed. The gas flow during sealing was gradually reduced to avoid a substantial pressure increase in the preform. This gradual decrease led to a flow rate of oxygen through the bubbler of 25 cc per minute and a secondary oxygen flow rate of 75 cc per minute. The torch was traversed across the length of the preform at rates varying from 6 to 10 cm per minute. During each pass the pressure in the tube was regulated by either controlling the escape, 15, from the preform of the gas being introduced or the rate of introduction of the combined gas flow. The pressure through these expedients was regulated to avoid excessively rapid collapse but to allow total collapse to occur after approximately 5 to 7 passes. A fiber was then drawn from the preform by a standard technique such as that described by L. L. Blyler, Jr. et al, in *Proceedings of IEEE*, 68, 1194–1198 (1980). The loss in the resulting fiber was measured through a procedure described in Chapter 11, *Optical Fiber Telecommunications*, ed. by S. E. Miller et al, Academic Press (1979). The resulting fibers showed OH absorption losses of 0.05 dB/km to 0.1 dB/km at 1.39 μm.

EXAMPLE 2

The same procedure as described in Example 1 was performed except that the preform was not initially sealed. As described in Example 1, the initial flow rate of oxygen through the bubbler was 330 cc per minute and the second oxygen flow was 1000 cc per minute. This ratio of flow rates between the carbon tetrachloride laden oxygen and the oxygen free from carbon tetrachloride was maintained. However, the combined total flow rate was decreased at a rate which allowed total collapse to occur in 7 passes. The resulting fibers showed OH absorption losses of 0.05 dB/km to 0.1 dB/km at 1.39 μm.

EXAMPLE 3

The procedure of Example 2 was followed except germanium tetrachloride was introduced simultaneously into the preform environment. This introduction was accomplished by passing oxygen at a rate of 15 cc per minute through a germanium tetrachloride bubbler held at a temperature of 40 degrees C. The flow rate through the germanium tetrachloride bubbler was not substantially changed through the entire collapse procedure. The resulting fiber had a measured OH absorption loss of approximately 0.1 dB/km at 1.39 μm.

What is claimed is:

1. A process for fabricating an optical fiber preform suitable for use in the formation of a glass optical fiber from a glass tube, said process comprising the steps of subjecting the bore of said tube to a drying gas composition, said composition including a drying gas which provides a reduction in the amount of OH entities in said preform, heating said glass tube to an elevated temperature, and modifying said glass tube through said heating by collapsing said bore to form said preform; wherein said drying gas comprises a carbon tetrahalide and wherein the total volume of all and any gas introduced into said bore contains a level less than 10 parts per million by weight of hydrogen however bound, of a hydrogen-containing contaminant capable of producing loss in said optical fiber whereby the optical adsorption loss of said fiber due to hydrogen-containing entities is substantially reduced relative to the loss obtained in the absence of said carbon tetrahalide use.

2. The process of claim 1 wherein said carbon tetrahalide comprises carbon tetrachloride.

3. The process of claim 2 including the step of drawing said fiber from said collapsed body.

4. The process of claim 1 wherein said carbon tetrahalide comprises CCl$_2$Br$_2$.

5. The process of claim 1 wherein said carbon tetrahalide comprises CCl$_3$Br.

6. The process of claim 1 including the step of drawing said fiber from said collapsed body.

7. The process of claim 1 wherein said gas is provided to said base by bubbling a carrier gas through a liquid.

8. The process of claim 7 wherein said liquid comprises carbon tetrachloride.

9. The process of claim 8 wherein said carrier gas comprises oxygen.

10. The process of claim 1 wherein said gas includes GeCl$_4$.

11. The process of claim 1 wherein said elevated temperature is in the range 2000 to 2200 degrees C.

* * * * *

UNITED STATES PATENT AND TRADEMARK OFFICE
CERTIFICATE OF CORRECTION

PATENT NO. : 4,842,626

DATED : June 27, 1989

INVENTOR(S) : Robert L. Barns, Edwin A. Chandross, Suzanne R. Nagel

It is certified that error appears in the above-identified patent and that said Letters Patent is hereby corrected as shown below:

In the claims, claim 7, column 6, line 39 "base" should read --bore--.

Signed and Sealed this

Twenty-first Day of August, 1990

Attest:

HARRY F. MANBECK, JR.

*Attesting Officer*      *Commissioner of Patents and Trademarks*